(12) United States Patent
Arienti et al.

(10) Patent No.: US 12,145,560 B2
(45) Date of Patent: Nov. 19, 2024

(54) DISSYMMETRIC BRAKING SYSTEM FOR VEHICLE

(71) Applicant: FRENI BREMBO S.P.A., Curno (IT)

(72) Inventors: Roberto Arienti, Curno (IT); Aristide Veneziano, Curno (IT)

(73) Assignee: Brembo S.p.A., Bergamo (IT)

( * ) Notice: Subject to any disclaimer, the term of this patent is extended or adjusted under 35 U.S.C. 154(b) by 657 days.

(21) Appl. No.: 17/267,643

(22) PCT Filed: Aug. 8, 2019

(86) PCT No.: PCT/IB2019/056774
§ 371 (c)(1),
(2) Date: Feb. 10, 2021

(87) PCT Pub. No.: WO2020/031139
PCT Pub. Date: Feb. 13, 2020

(65) Prior Publication Data
US 2021/0323518 A1    Oct. 21, 2021

(30) Foreign Application Priority Data

Aug. 10, 2018  (IT) .................. 102018000008042

(51) Int. Cl.
*B60T 8/24* (2006.01)
*B60T 8/17* (2006.01)
(Continued)

(52) U.S. Cl.
CPC ............... *B60T 8/241* (2013.01); *B60T 8/17* (2013.01); *B60T 8/26* (2013.01); *B60T 13/662* (2013.01);
(Continued)

(58) Field of Classification Search
CPC .......... B60T 8/241; B60T 8/17; B60T 13/662; B60T 2270/82; B60T 17/08; B60T 17/06; B60T 8/26
See application file for complete search history.

(56) References Cited

U.S. PATENT DOCUMENTS 2,924,306 A    2/1960  Martin
3,245,221 A    4/1966  James et al.
(Continued)

FOREIGN PATENT DOCUMENTS

DE    102013218919 A1    3/2015
EP        2546118 A1    1/2013
(Continued)

OTHER PUBLICATIONS

Tilton Engineering, Inc., Installation Instructions, Brake Proportioning Valve; 98-1261; http://tiltonracing.com/wp-content/uploads/98-1261-Brake-Proportioning-Valve_.pdf; Tilton Engineering, Inc., Buellton, California.
(Continued)

*Primary Examiner* — Pamela Rodriguez
(74) *Attorney, Agent, or Firm* — Marshall & Melhorn, LLC

(57) ABSTRACT

A dissymmetric braking system has at least one right wheel braking device, at least one left wheel braking device, at least one device to apply a braking action, at least one actuating device to transform the braking action into a first pressure, at least one right wheel connection, at least one left wheel connection, and at least one pressure reducing device having at least one transfer device receiving the first pressure. The transfer device transforms the first pressure into a reduced second pressure, whereby avoiding, during the braking action, a fluidic connection between a fluid having the first pressure and a fluid having the second pressure to determine, during the braking action, a relationship between (Continued)

the first pressure and the second pressure with linear trend without variation of linearity throughout the operating field of the pressure reducing device, so that the braking action of one of the right wheel braking device and left wheel braking device is lower than the other.

17 Claims, 9 Drawing Sheets

(51) Int. Cl.
*B60T 8/26* (2006.01)
*B60T 13/66* (2006.01)
*B60T 17/06* (2006.01)
*B60T 17/08* (2006.01)

(52) U.S. Cl.
CPC .............. *B60T 17/06* (2013.01); *B60T 17/08* (2013.01); *B60T 2270/82* (2013.01)

(56) References Cited

U.S. PATENT DOCUMENTS

| | | | |
|---|---|---|---|
| 3,837,713 A | | 9/1974 | Masuda et al. |
| 4,049,322 A | * | 9/1977 | Farr ........................ B60T 8/26 303/9.74 |
| 4,113,317 A | | 9/1978 | Farr |
| 4,205,883 A | | 6/1980 | Gaiser |
| 4,544,210 A | | 10/1985 | Nagashima |
| 4,702,529 A | | 10/1987 | Tobiasz |
| 4,707,036 A | | 11/1987 | Farr |
| 4,986,609 A | | 1/1991 | Cole et al. |
| 5,147,113 A | | 9/1992 | Nisonger et al. |
| 5,433,514 A | | 7/1995 | Tsukamoto et al. |
| 5,641,209 A | * | 6/1997 | Kushi ....................... B60T 8/30 303/9.69 |
| 8,342,616 B2 | | 1/2013 | Sawada |
| 8,670,912 B2 | | 3/2014 | Fujiwara et al. |
| 10,471,939 B2 | | 11/2019 | Hara et al. |
| 2002/0008423 A1 | * | 1/2002 | Yasui ...................... B60T 8/246 303/9.62 |
| 2003/0094202 A1 | | 5/2003 | Hansen et al. |
| 2004/0245850 A1 | * | 12/2004 | Sakai .................... B60T 8/1766 303/113.4 |
| 2010/0270855 A1 | * | 10/2010 | Sawada ................ B60T 8/1766 303/113.2 |
| 2013/0001026 A1 | | 1/2013 | Osakabe et al. |
| 2016/0138726 A1 | | 5/2016 | Saito et al. |
| 2017/0153653 A1 | | 6/2017 | Hata et al. |

FOREIGN PATENT DOCUMENTS

| | | |
|---|---|---|
| EP | 3326876 A1 | 5/2018 |
| WO | WO2011/036527 A1 | 3/2011 |

OTHER PUBLICATIONS

European Patent Office, International Search Report with Written Opinion, issued in PCT/IB2019/056774, Sep. 19, 2019, 12 pages, European Patent Office, Rijswijk, Netherlands.

* cited by examiner (STATE OF THE ART)

DISSYMMETRIC BRAKING SYSTEM FOR VEHICLE

CROSS-REFERENCE TO RELATED APPLICATIONS

This application is a National Phase Application of PCT International Application No. PCT/IB2019/056774, having an International Filing Date of Aug. 8, 2019 which claims priority to Italian Application No. 102018000008042 filed Aug. 10, 2018, each of which is hereby incorporated by reference in its entirety.

FIELD OF THE INVENTION

The object of the present invention is a dissymmetric braking system for a vehicle.

The present invention in particular relates to a braking system which comprises a device to apply a braking action by the driver, such as e.g. a pedal, an actuating device to transform the braking action into a braking pressure command, or input pressure, such as e.g. a brake cylinder, a right wheel connection conduit between said actuating device and a first axle right wheel braking device, e.g. a right wheel disc brake, a left wheel connection conduit between said actuating device and a first axle left wheel braking device, e.g. a left wheel disc brake, and also a pressure reducing device provided in one of said connection conduits.

BACKGROUND ART

In vehicles, and in sports vehicles in particular, it is particularly important to maximize the braking action and allow a safe control of the vehicle by the driver, in order to have a balanced braking action.

For this reason, two brake cylinders (two master cylinders) operated with a single pedal by the driver of the vehicle are often used so as to send a separate but similar (hydraulic) signal to the front and rear brakes or in a crossed manner to the front right and rear left wheel and front left and rear right wheel (or vice versa).

Again for the same reason, it is known to differentiate the braking action between axle and axle in order to avoid locking the wheels of less loaded axles.

To solve this known problem, it is known to provide brake circuits with pressure reducers which transmit a different pressure signal between the front vehicle axle and the rear vehicle axle.

It is known in particular, by means of reducing pressure valves, to transform an input pressure or Pin into a different and reduced output pressure or Pout in a single fluid conduit for feeding the brakes of a whole axle of the vehicle. Solutions of this type are known for example, from U.S. Pat. Nos. 4,113,317, 5,433,514, US2017153653A1, US2016138726A1 and US2003094202A1.

These known solutions put the valve input fluidically in communication with the output thereof to have a fluid flow which reduces the pressure thereof and is sent as control to the disc brake.

However, the need is strongly felt in the prior art to have a response to the less loaded axle of the vehicle, typically the rear one, which simultaneously starts and with the same intensity as the front axle to then only successively decrease the action thereof when the weight of the braked vehicle moves in particular manner on the front axle, also due to the braking. Therefore, there is a strong desire in the prior art to reduce the pressure at the rear brakes only after a predetermined braking intensity threshold, typically of control pressure or input pressure Pin, as depicted in FIG. 3.

For this reason, it is known to insert a proportional valve in the braking system, between the brake cylinder and the brake discs of the rear axle, which due to low pressure values, allows an input pressure or Pin to be obtained which is identical to the output pressure or Pout to then reduce the output pressure or Pout with respect to the value of the input pressure or Pin at a predetermined threshold value. Solutions of this type are known from U.S. Pat. Nos. 3,837,713A, 4,205,883, 4,702,529, 4,986,609, 5,147,113, 2,924,306, 3,245,221, 4,544,210, 4,707,036.

Furthermore, the vehicle is adjusted in the case of sports vehicles, and in particular of vehicles which race on oval tracks with outwardly superelevated curves in order to have an inclined road surface (track banking—see FIG. 13), for example with toe-in and camber, which point the vehicle towards the inner curve so as to facilitate traveling the oval track (see FIG. 14).

However, if the braking system is operated here, the same braking action on the front inner curve wheel and on the outer curve wheel bring about an accentuation of the tendency of the vehicle to close out the curve, making the drivability of the vehicle even more complex.

To solve this problem, it is known to insert a proportioning valve on one conduit alone which feeds the brake fluid to the disc brake of a front wheel so that after an initial identical braking command on both wheels, one of them decreases the braking intensity thereof. This solution is known for example from Tilton Engineering (http://tilton-racing.com/wp-content/uploads/98-1261-Brake-Proportion-ing-Valve_.pdf).

By initially determining a same input Pin and output Pout pressure up to reaching a limit, past which the output pressure is reduced with respect to the input pressure, all of these known solutions keep from meeting the strongly felt need to avoid the vehicle, for example in a curve of an oval track, from emphasizing its oversteering right from the start, thus closing out the curve in a manner which is complex to manage by the driver. Indeed, at the beginning of the braking, due to the identical pressure signal imparted to the disc brakes of both inner and outer curve wheels, the vehicle immediately starts closing out the curve, thus determining a trajectory setup which then becomes complex to correct also if the braking action of the inner curve wheel successively decreases.

Thus, these known solutions do not allow solving all the strongly felt needs of:
  in addition to desiring the differentiation of the braking action on the wheels of the same axle (inner curve wheel and outer curve wheel), compensate the tendency of the vehicle to go towards in the inside of the curve from the start, then reducing the braking action of the wheel(s) on the inner curve side from the start;
  keeping the braking action on the inner curve wheel proportional to the outer curve wheel and throughout the field of pressures applied to the braking system, thus making the vehicle much more comprehensible for the driver to manage;
  allowing an immediate differentiation of the braking action between the wheels of the same axle and above all, the strongly felt need to be met to allow an adjustment of the braking system according to the track, the road surface and the adjustment or malfunctioning of the vehicle, albeit while reducing the pressure on the inner curve side of the vehicle with respect to the outer side of the vehicle (or vice versa if required by the performance for example, for an incorrect setting of the vehicle or a different road surface from the one described above).

Solution

These and other objects are achieved by the braking system, the pressure reducing device, the assembly of a pressure reducing device and a multiplicity of elastic elements, the vehicle, and the method for reducing braking pressure as described and claimed herein.

Certain advantageous embodiments are also described.

An analysis of this solution has shown how the solution proposed allows a pressure reducing system to be obtained which meets the above-described felt and continuing needs due to solutions of the prior art which are misguided for a person skilled in the art.

DRAWINGS

Further features and advantages of the invention will be apparent from the description provided below of preferred embodiments thereof, given by way of non-limiting examples, with reference to the accompanying drawings, in which:

FIG. 1 depicts a diagrammatic view of a braking system according to the prior art, in which the braking action is positively synchronized between the front and rear axle but there are identical or similar braking actions on the wheels of the same axle;

FIG. 2 shows a braking system according to the present invention, in which there is inserted a braking pressure reducing device made according to the present invention in the branches of the system directed at controlling the braking action of one side of the vehicle, here the left side of the vehicle with respect to the direction of travel indicated in the drawing which also shows the direction and path of travel for example, of an oval track with superelevated curves towards the left with respect to the driver; in this drawing the braking actions F1, F3 of the left side of the vehicle, or inner curve side, are smaller than the braking actions F4, F5 of the right side of the vehicle, or outer curve side;

FIG. 3 depicts a proportional relationship diagram between the control pressure or pressure input into a pressure reducing device made according to the prior art, in which the output pressure of the device is variable according to the adjustment of the device; as is shown, the output pressure in a first stretch of the relationship which is always present, is of identical entity to the input pressure, to then be reduced as an adjustable threshold is reached;

FIG. 4 depicts a relationship diagram between the control pressure or pressure input P1 or Pin to a pressure reducing device according to the invention and the output pressure P2 or Pout of the device which is variable according to the adjustment of the device; as is shown, the dotted line indicates the relationship of the prior art, the solid line shows the various relationships obtained by adjusting the device of the invention by changing the elastic constant K1 of the first elastic element 14 (in which the linear trend has an inclination with respect to the axles Pin and Pout proportional to K1, . . . Ki, Ki+1, . . . Kn,);

FIG. 5 depicts a relationship diagram between the control pressure or pressure input P1 or Pin to a pressure reducing device according to the invention, and the output pressure P2 or Pout of the device which is variable according to the adjustment of the device; as is shown, the dotted line indicates the relationship of the prior art, the solid line shows the various relationships obtained by adjusting the device of the invention by changing the preload of the first elastic element 14 (in which the linear trend has an inclination with respect to the axles Pin and Pout again proportional to K1);

Figure 1:
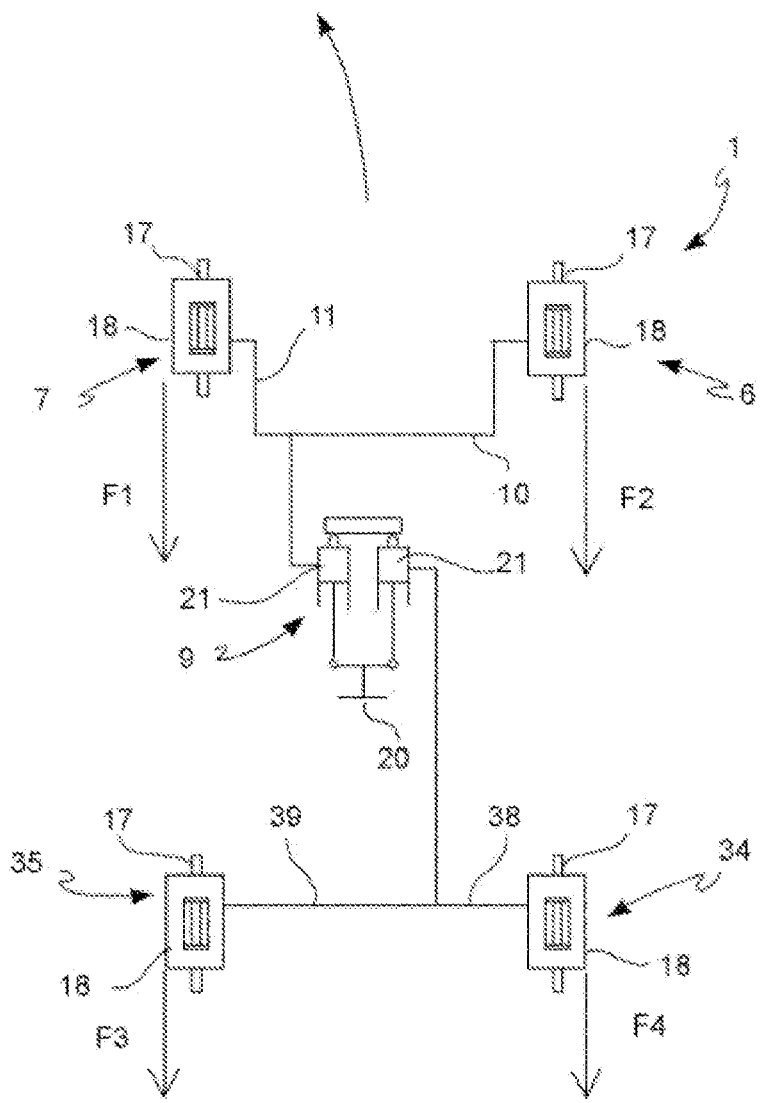
Figure 2:
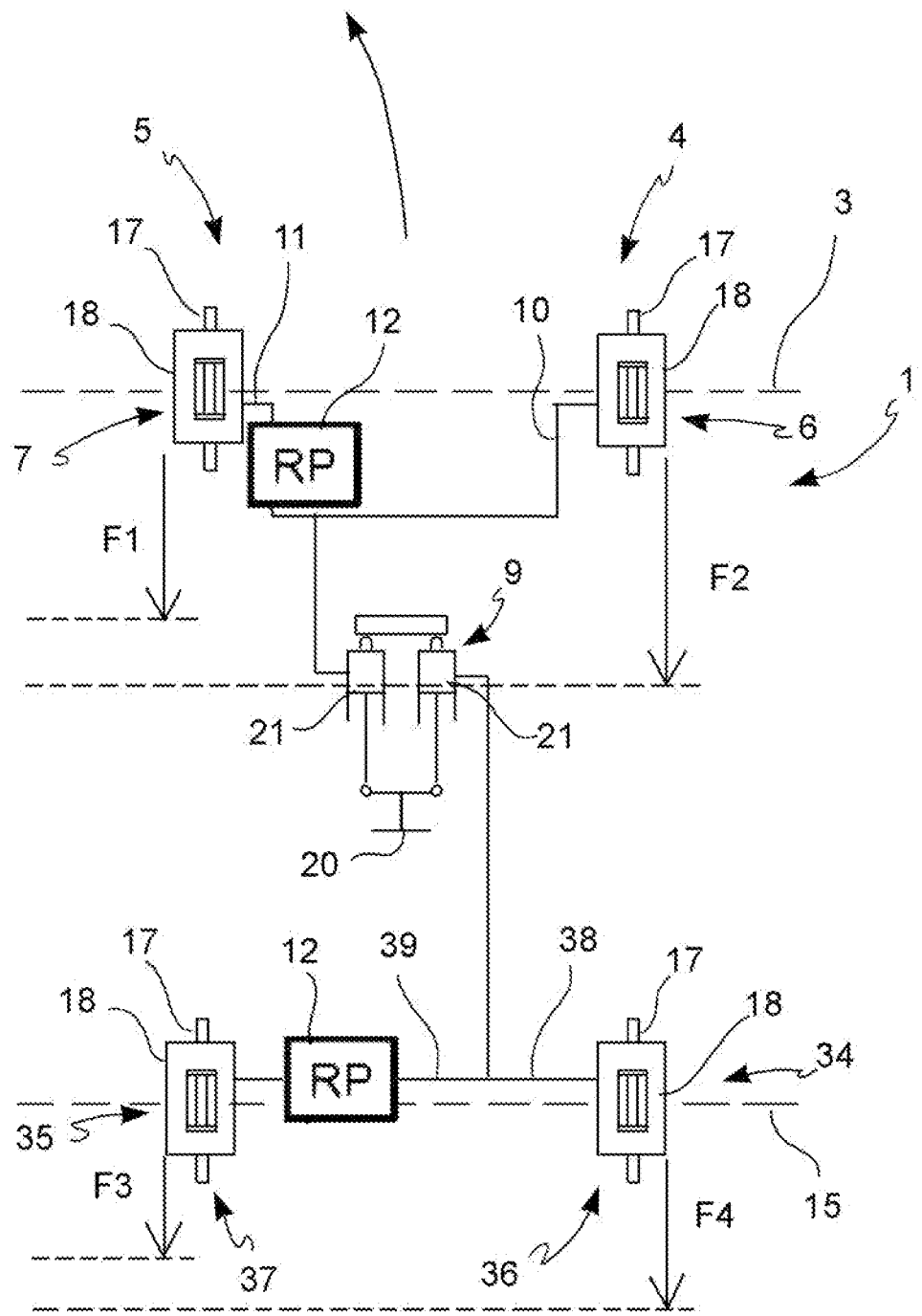
Figure 3:
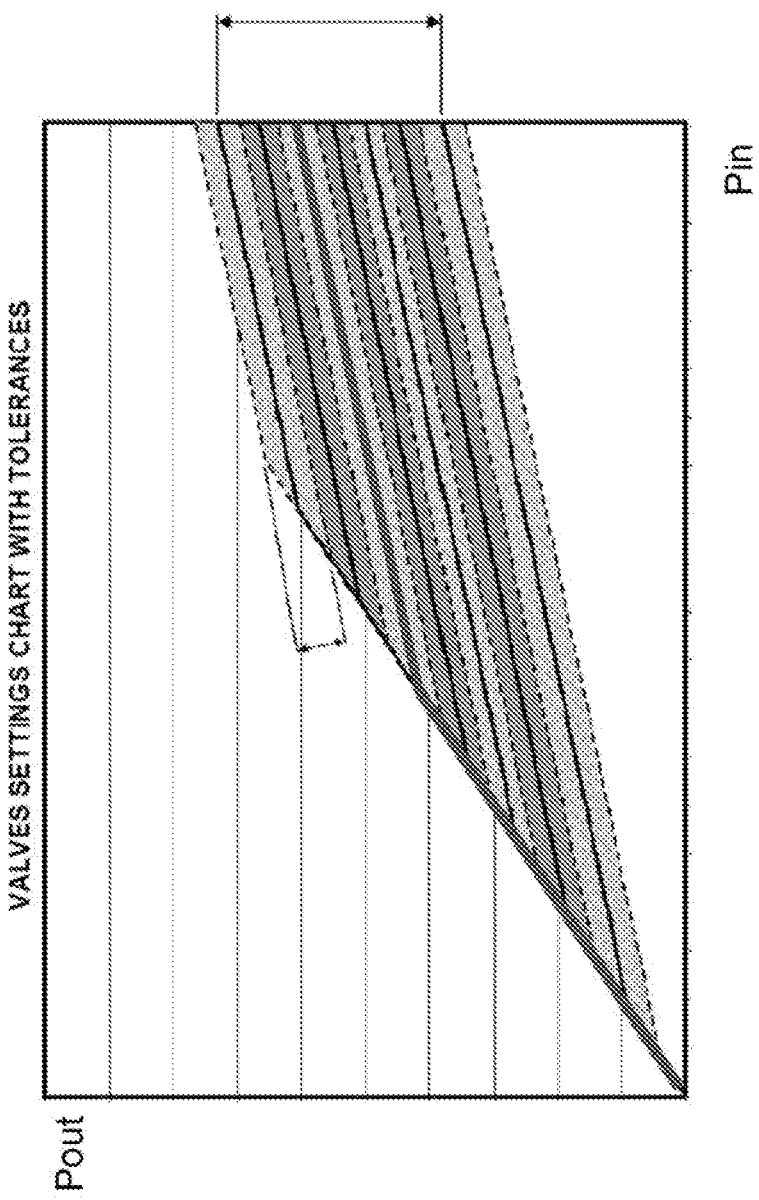
Figure 4:
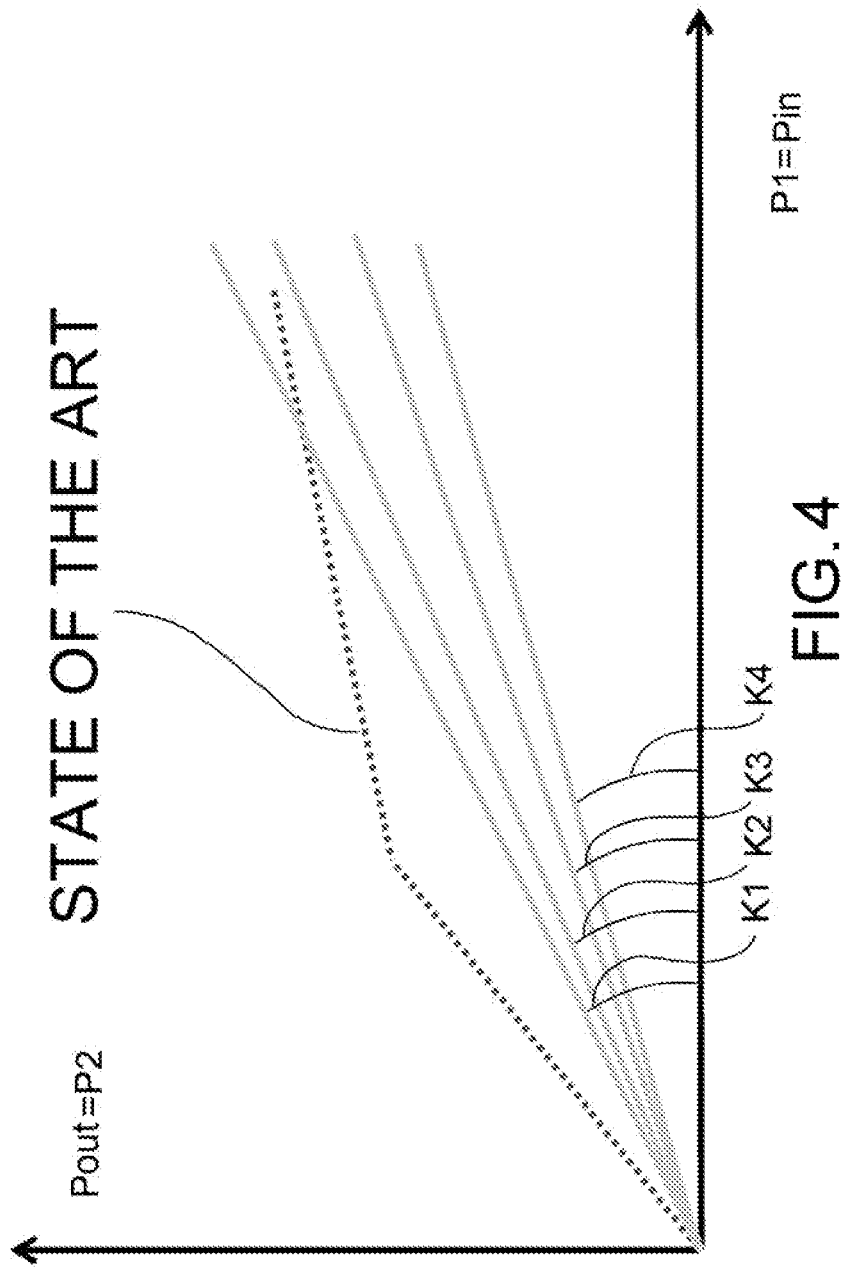
Figure 5:
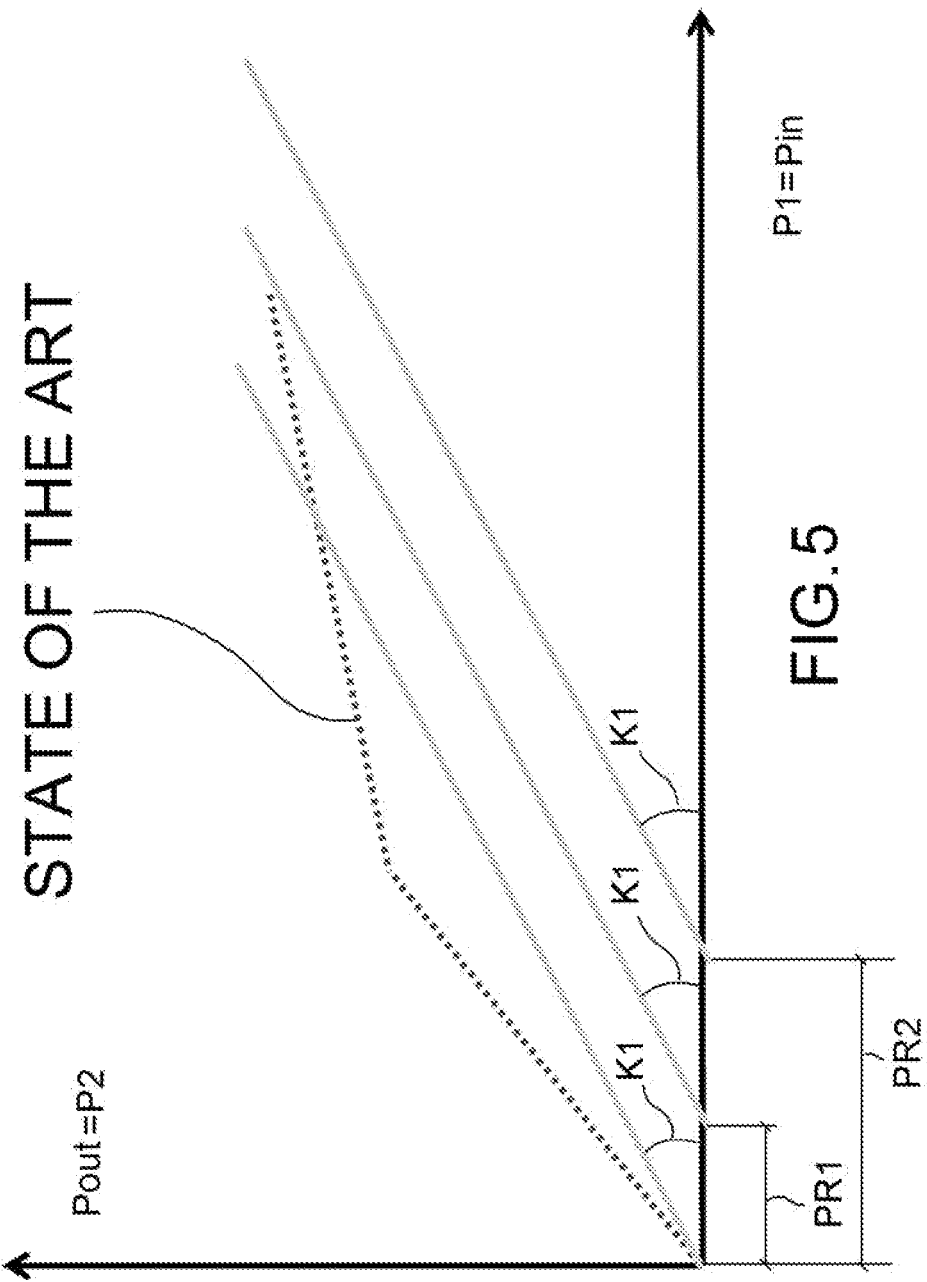
Figure 6:
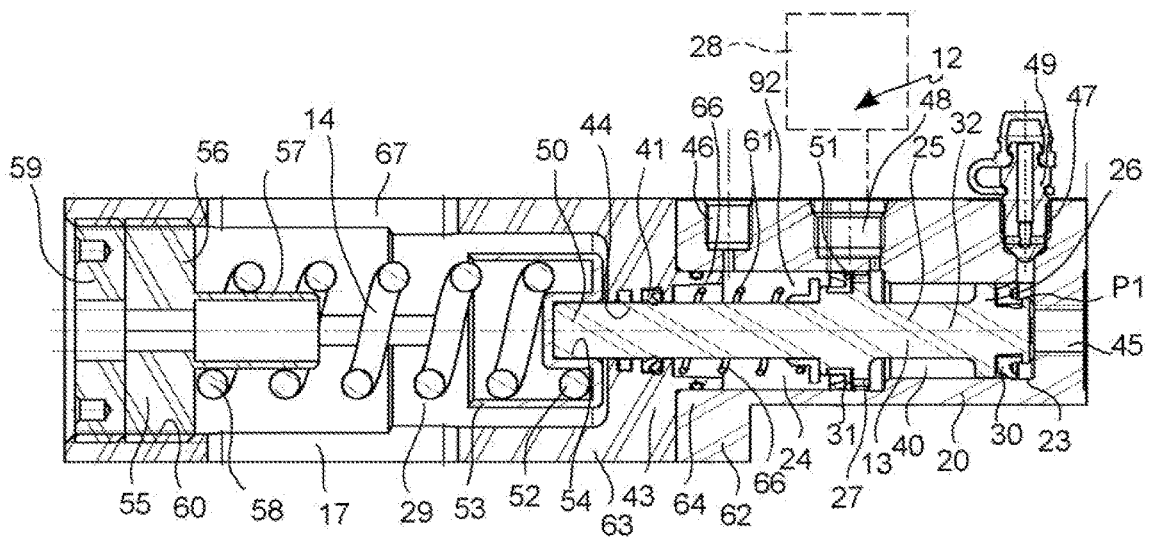
FIG. 6 shows a longitudinal sectional view of a pressure adjusting device according to the invention, according to a first elastic constant and preload setting.
Figure 7:
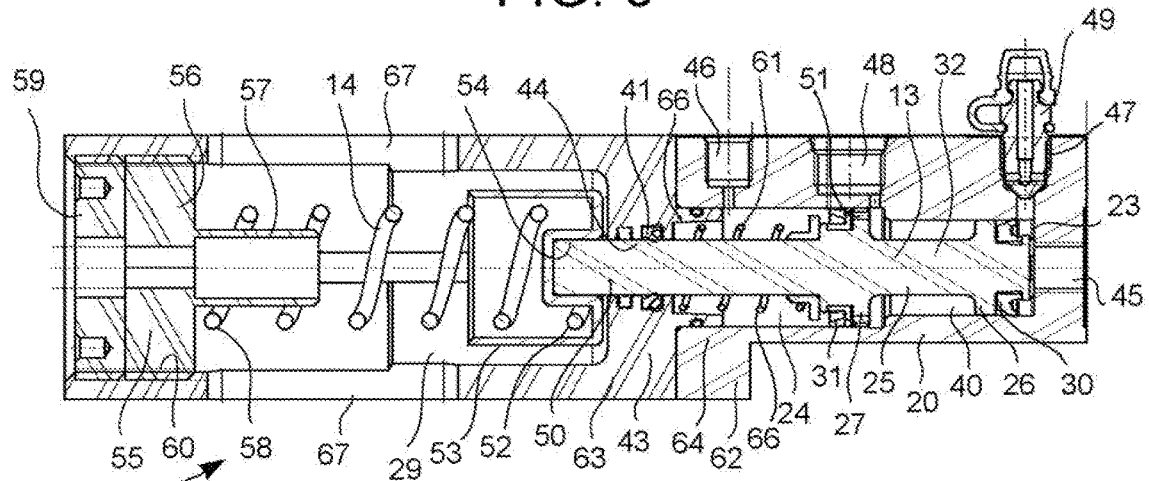
FIG. 7 shows a longitudinal sectional view of a pressure adjusting device according to the invention, according to a second elastic constant setting, lower than the one of the adjustment in FIG. 6, and similar preload.
Figure 8:
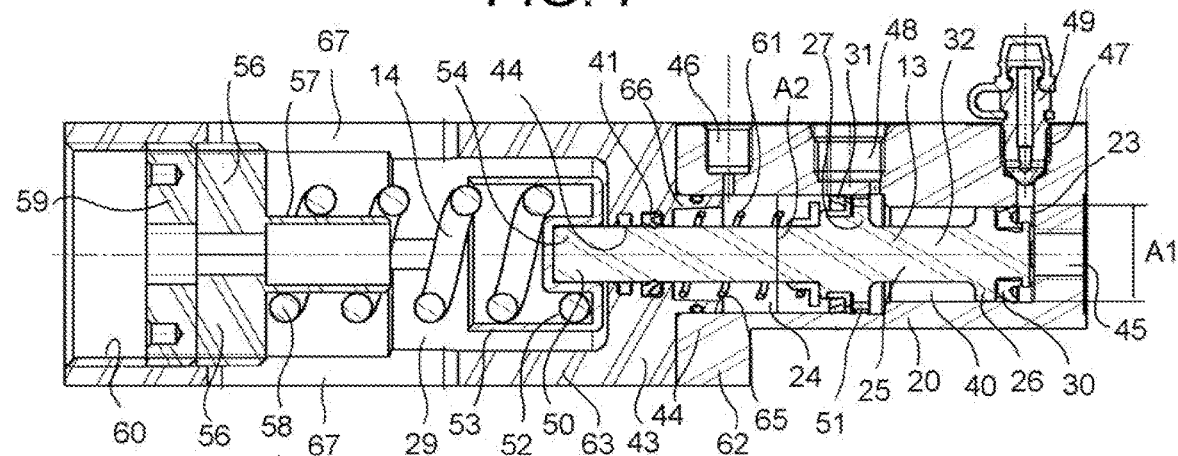
FIG. 8 shows a longitudinal sectional view of a pressure adjusting device according to the invention, according to a second elastic constant setting, similar to the one of the adjustment in FIG. 6, and a greater preload with respect to the one in FIG. 6.
Figure 9:
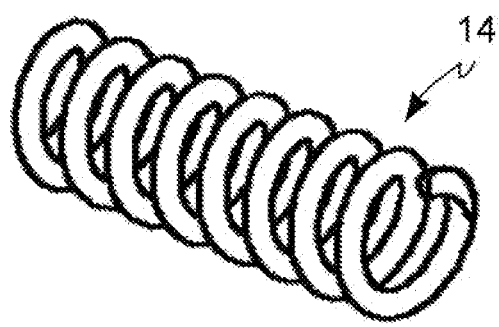
FIGS. 9 to 11 show a multiplicity of first elastic elements 14 which can be used for example, in an assembly, or kit, according to the invention in conjunction with a pressure adjusting device, as depicted in FIG. 6.
Figure 10:
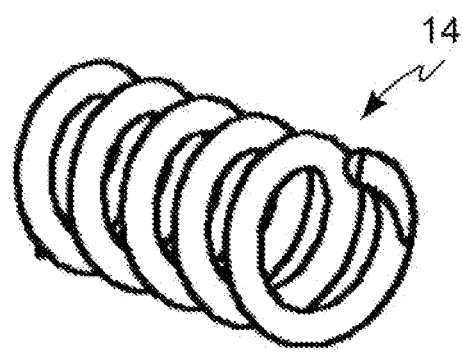
Figure 11:
Figure 12:
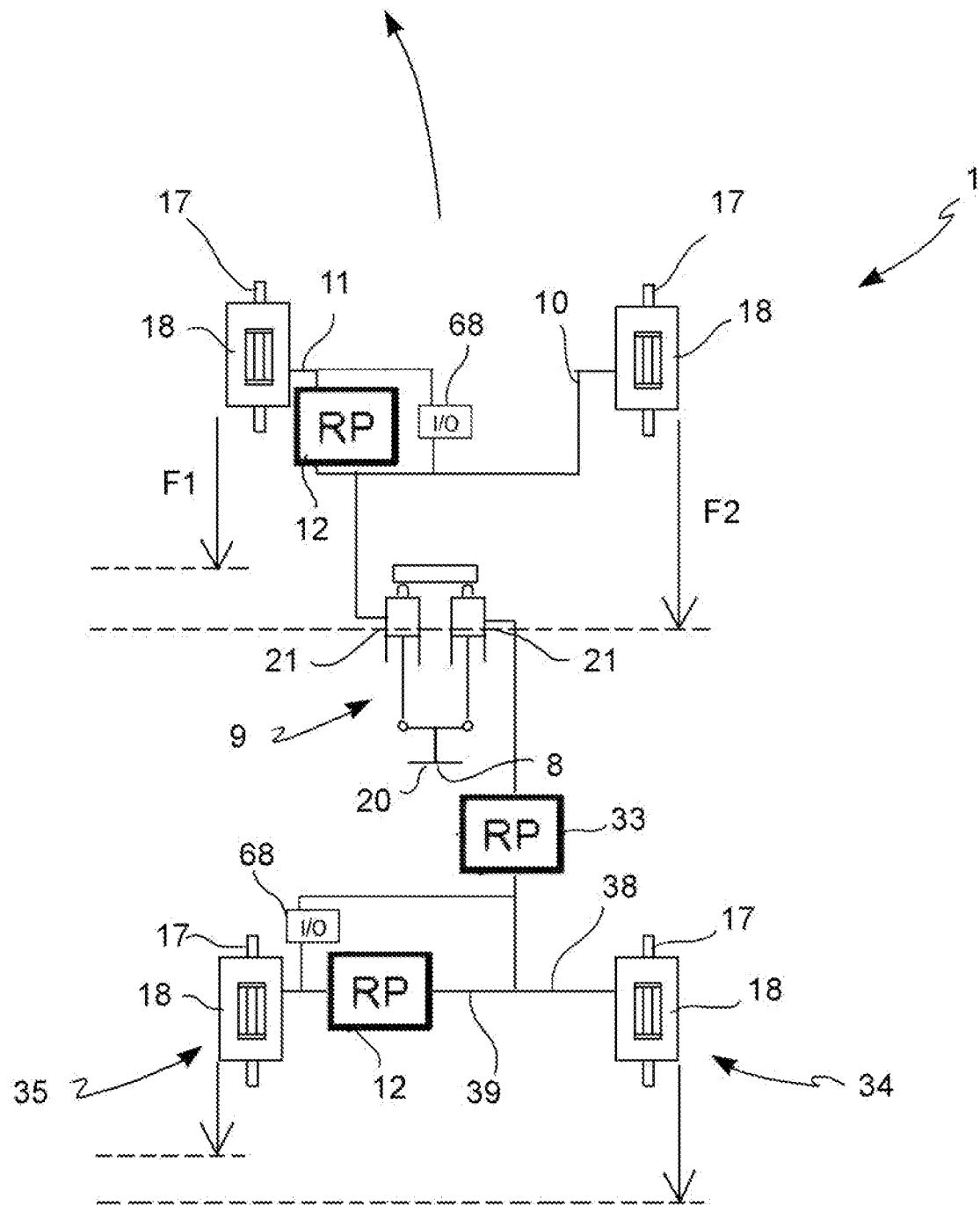
FIG. 12 shows a variant of the braking system according to the invention, in which there is provided a by-pass conduit 68 which, according to the adjustment selected by the driver of the vehicle, allows controlling a braking device, whereby avoiding or involving a braking adjustment device.
Figure 13:
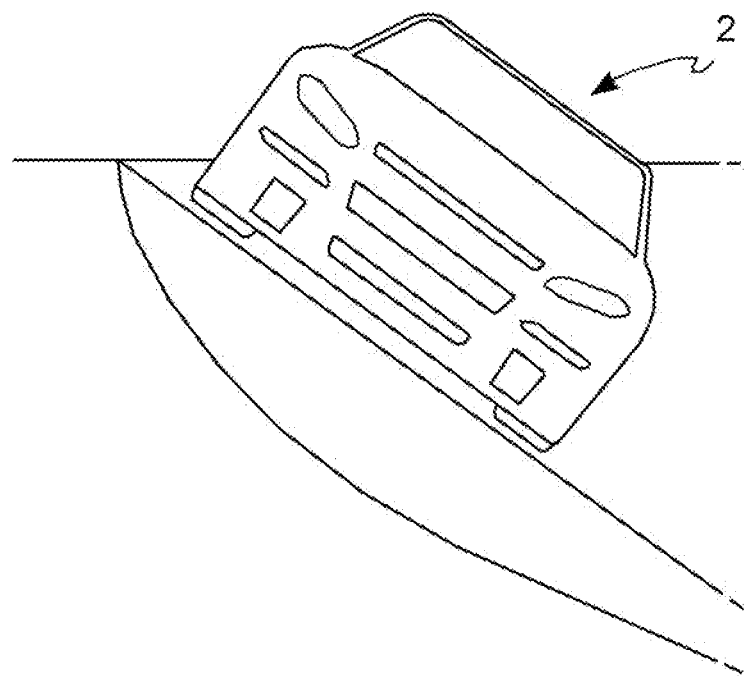
FIG. 13 depicts a vehicle, in cross section transverse to the drawing, in a step of traveling a superelevated curve of an oval track, for example, as known in the NASCAR races.
Figure 14:
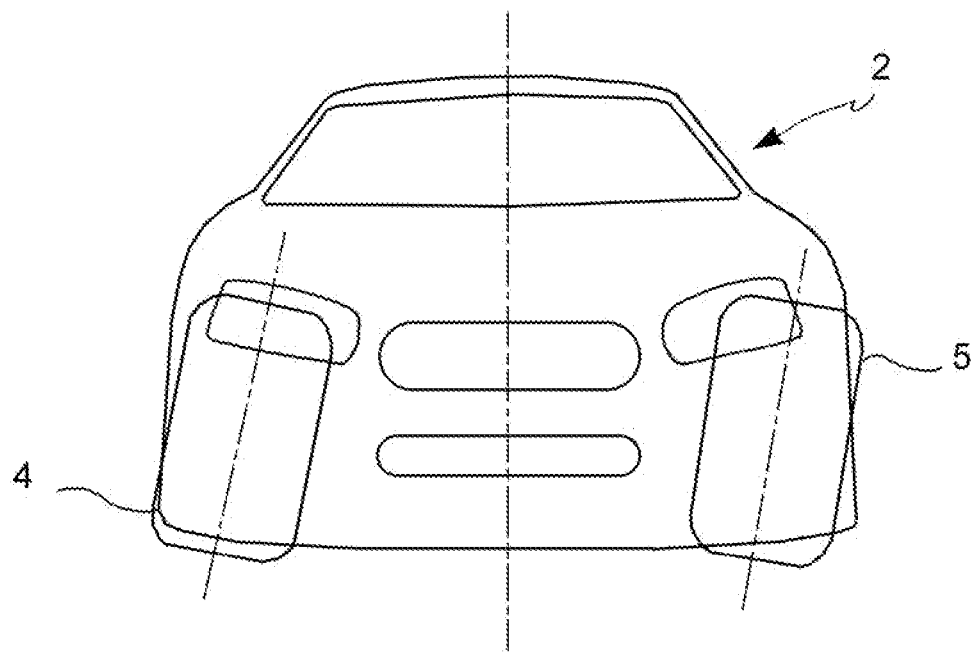

FIG. 14 diagrammatically shows a vehicle and the camber adjustment thereof of the two wheels on the same axle to facilitate the travelling of a superelevated curve of an oval track with anticlockwise direction of travel.

DESCRIPTION OF SOME PREFERRED EMBODIMENTS

According to a general embodiment, is provided a dissymmetric braking system 1 for a vehicle 2.

Said vehicle comprises at least one first vehicle axle 3 or 15 supported by at least one right axle wheel 4 or 36 and at least one left axle wheel 5 or 37 of the vehicle.

Said braking system 1 comprises at least one right wheel braking device 6 or 34; at least one left wheel braking device 7 or 35; at least one device to apply a braking action by the driver 8; at least one actuating device 9 to transform the braking action into a braking pressure command or first pressure or input pressure P1.

Said braking system 1 further comprises at least one right wheel connection 10 or 38 between said at least one actuating device 9 and said first axle right wheel braking device 6 or 34; at least one left wheel connection 11 or 39 between said at least one actuating device 9 and said first axle left wheel braking device 7 or 35.

Advantageously, at least one pressure reducing device 12 is provided in one of said connections 10, 11 or 38, 39.

Said pressure reducing device 12 comprises at least one transfer device 13 which receives said first pressure P1.

As a further advantage, said at least one transfer device 13 transforms said first pressure P1 into a reduced braking pressure or second pressure or output pressure P2 whereby avoiding, during the braking action, a fluidic connection between a fluid which has said first pressure P1 and a fluid which has said second pressure P2 so as to determine, during the braking action, a relationship between said first pressure P1 and said second pressure P2 with linear, or proportional, trend without variation of linearity or proportionality throughout the operating field of the pressure reducing device 12, and so that the braking action of one of said at least one right wheel braking device 6 or 34 and at least one left wheel braking device 7 or 35 is lower than the other.

According to one embodiment, said pressure reducing device 12 comprises at least one first elastic element 14 which has a first elastic constant K1 of predetermined entity. Said at least one first elastic element 14 constantly biases said at least one transfer device 13 acting in opposition to the bias of said first pressure P1.

According to one embodiment, said device to apply a braking action by the driver 8 is at least one brake pedal 20.

Said actuating device 9 is a brake cylinder or master cylinder 21 controlled by said brake pedal 20.

Said at least one right wheel connection 10 or 38 is a feeding fluid conduit which fluidically connects said brake cylinder 21 to said right wheel braking device 6 or 34.

Said at least one left wheel connection 11 or 39 is a feeding fluid conduit which fluidically connects said brake cylinder 21 to said left wheel braking device 7 or 35.

According to one embodiment, said vehicle 2 comprises at least two axles, a first front axle 3 and a second rear axle 15.

According to one embodiment, each axle 3, 15 comprises a right wheel disc brake 16 comprising a brake disc 17 and a brake caliper 18 located astride the disc brake.

According to one embodiment, each axle 3, 15 comprises a left wheel disc brake 19 comprising a brake disc 17 and a brake caliper 18 located astride the disc brake.

According to one embodiment, said device to apply a braking action by the driver 8 is a brake pedal 20 or a brake lever.

According to one embodiment, said actuating device 9 is two brake cylinders or a dual master cylinder 21, arranged mutually in parallel and controlled simultaneously by said brake pedal 20 or brake lever.

A first brake cylinder 21 is intended for the front braking action and a second brake cylinder 21 is intended for the rear braking action or for crossed braking actions between front right or left wheels and rear left or right wheels.

According to one embodiment, said connection in which said pressure reducing device 12 is provided is a front right wheel connection 10.

According to one embodiment, said connection in which said pressure reducing device 12 is provided is a rear right wheel connection 38.

According to one embodiment, said connection in which said pressure reducing device 12 is provided is a front left wheel connection 11.

According to one embodiment, said connection in which said pressure reducing device 12 is provided is a rear left wheel connection 39.

According to one embodiment, said pressure reducing device 12 is provided in only one of said right or left wheel connections 10 or 11 or 38 or 39.

According to one embodiment, said pressure reducing device 12 is provided for both wheels of the same side of the vehicle with respect to the direction of travel of the vehicle.

According to one embodiment, said pressure reducing device 12 is provided in both the front and rear right wheel connections 10 and 38.

According to one embodiment, said pressure reducing device 12 is provided in both the front and rear left wheel connections 11 and 39.

According to one embodiment, said fluid is a brake fluid.

According to one embodiment, said system 1 is a hydraulic system.

According to one embodiment, said system 1 is an electro-hydraulic system in which some components are electrically actuated.

According to one embodiment, said system 1 is a brake-by-wire system in which all components are electrically actuated.

According to one embodiment, said system 1 also provides a further symmetric pressure reducing device 33 to reduce the pressure directed to both braking devices 34, 35 of the rear axle 15 to differentiate the braking between the front vehicle axle or first vehicle axle 3 and the rear vehicle axle or second vehicle axle 15.

According to one embodiment, said further symmetric pressure reducing device 33 is arranged upstream, closer to the actuating device master cylinder 9, with respect to the pressure reducing device 12.

According to one embodiment, said further symmetric pressure reducing device 33 is arranged downstream, further from the actuating device master cylinder 9, with respect to the pressure reducing device 12.

According to one embodiment, said at least one transfer device 13 transforms said first pressure or input pressure P1 into a reduced braking pressure or second pressure or output pressure P2, whereby avoiding, during the braking action, a fluidic connection between a fluid which has said first pressure P1 and a fluid which has said second pressure P2 and avoiding the creation of a fluid flow between the receiver of said first pressure P1 and said second pressure P2.

According to one embodiment, said pressure reducing device 12 comprises a pressure reducing device body 22.

Said pressure reducing device body 22 comprises:

A first pressure reducing device chamber or input chamber 23, in which said first pressure P1 is provided;

a second pressure reducing device chamber or output chamber 24, in which said second pressure P2 is provided.

According to one embodiment, said input chamber 23 provides an input chamber dimension A1 which is transverse to a sliding direction of said transfer device 13. Said output chamber 24 provides an output chamber dimension A2 which is transverse to a sliding direction of said transfer device 13, and said input chamber dimension A1 is smaller than said output chamber dimension A2.

According to one embodiment, said pressure reducing device body 22 comprises a third chamber 29, and in which said at least one first elastic element 14 is accommodated in said third chamber 29.

According to one embodiment, said pressure reducing device body 22 comprises a fourth chamber 40 arranged between said first chamber 23 and said second chamber 24 and separated from said first and second chamber 23, 24 in fluid-tight manner by means of one-way seals 30, 31.

According to one embodiment, said second chamber 24 is closed on a side thereof opposite to said first chamber 23 by a separating wall 43 of the pressure reducing device body 22.

According to one embodiment, said separating wall 43 comprises a rod through-housing 44 adapted to accommodate said transfer device 13, e.g. a floating rod 25, in fluid-tight and sliding manner.

According to one embodiment, said rod through-housing 44 is arranged between said second chamber 24 and said third chamber 29.

According to one embodiment, said rod through-housing 44 comprises a third one-way fluid-tight seal 41 which confines the fluid in said second chamber.

According to one embodiment, said rod through-housing 44 comprises a scraper seal between body and rod 42 which acts on the outer skirt of said floating rod 25.

According to one embodiment, said first chamber or input chamber 23 comprises an input opening 45 adapted to connect said first chamber 23 to said connection 10 or 11 or 38 or 39 in fluid-tight manner in order to connect said pressure reducing device 12 to said actuating device 9.

According to one embodiment, said second chamber or output chamber 24 comprises an output opening 46 adapted to connect said second chamber 24 to said connection 10 or 11 or 38 or 39 in fluid-tight manner in order to connect said pressure reducing device 12 to said braking device 6 or 7 or 34 or 35.

According to one embodiment, said first chamber or input chamber 23 comprises a bleeding opening 47 adapted to connect said first chamber 23 to a bleeding device 49 in fluid-tight manner.

According to one embodiment, said pressure reducing device body 22 comprises a tank opening 48 adapted to connect said connection 10 or 11 or 38 or 39 to a fluid tank 28 for accommodating a braking system fluid reserve.

According to one embodiment, said tank opening 48 is provided in said fourth chamber 40.

According to one embodiment, said fluid tank 28 is connectable to said second chamber 24, allowing the feeding of fluid during the return stroke of the second plate 27 for recalling by vacuum the fluid into the second chamber by means of said second one-way seal 31 which allows the passage of fluid from the outside, e.g. from the fourth chamber 40 into the second chamber 24, e.g. if the brake pads in a brake caliper 18 are worn.

According to one embodiment, said fluid tank 28 is connectable to said first chamber 23, allowing the feeding of fluid during the return stroke of the first plate 26 for recalling by vacuum the fluid into the first chamber 23 by means of said first one-way seal 30 which allows the passage of fluid from the outside, e.g. from the fourth chamber 40 into the first chamber 23.

According to one embodiment, said pressure reducing device body 22 comprises a third chamber or elastic device chamber 29.

According to one embodiment, said third chamber 29 receives said first elastic element 14.

According to one embodiment, said third chamber 29 receives an active rod end 50 which is at least partially accommodated in said third chamber 29, whereby cooperating with said first elastic element 14.

According to one embodiment, said transfer device 13 is a floating rod 25 which comprises at least two thrust plates 26, 27, an input chamber first thrust plate 26 and an output chamber second thrust plate 27.

According to one embodiment, said first and second plate 26, 27 are mechanically connected to one another and are integral with the floating rod 25 itself at a mutually predetermined distance so that said input chamber first thrust plate 26 is arranged in floating and fluid-tight manner in said first chamber or input chamber 23 and said output chamber second thrust plate 27 is arranged in floating and fluid-tight manner in said second chamber or output chamber 24.

According to one embodiment, said first plate 26 comprises a predetermined first plate action area A1 of predetermined dimensions transverse to the movement direction of said floating rod 25.

According to one embodiment, said second plate 27 comprises a predetermined second plate action area A2 of predetermined dimensions transverse to the movement direction of said floating rod 25.

According to one embodiment, said first plate action area A1 of said first plate 26 is smaller than the second plate action area A2 of said second plate 27.

According to one embodiment, said floating rod 25 is in one piece with said first plate 26 and with said second plate 27.

According to one embodiment, a first one-way seal 30 is associated with said first plate 26 which makes it possible to form a seal in said first chamber or input chamber 23 so as to prevent fluid passage between said first chamber 23 and said second chamber 24 and/or between said first chamber 23 and said fourth chamber 40.

According to one embodiment, a second one-way seal 31 is associated with said second plate 27 which makes it possible to form a seal in said second chamber or output chamber 24 between said second chamber 24 and said first chamber 23 and/or between said second chamber 24 and said fourth chamber 40.

According to one embodiment, said second plate 27 comprises second plate connecting through holes 51 for the passage of fluid, said second plate connecting through holes 51 being selectively closed by a second one-way seal 31 during the braking action.

According to one embodiment, said floating rod 25 between said first plate 26 and said second plate 27 comprises a spacer rod portion 32 which separates the two plates 26, 27.

According to one embodiment, said floating rod 25 is in one piece with an active rod end 50 which is at least partially accommodated in a third chamber 29, whereby cooperating with said first elastic element 14 which is accommodated in said third chamber 29.

According to one embodiment, said floating rod 25 enters into said first chamber 23, said floating rod 25 crosses said fourth chamber 40, said floating rod 25 crosses said second chamber 24 and said floating rod 25 enters into said third chamber 29.

According to one embodiment, said at least one first elastic element 14 is interchangeable by selecting predetermined and mutually different elastic constants K1, Ki, . . . . Kn.

According to one embodiment, said transfer device 13 comprises an active rod end 50 which is constantly biased by said at least one first elastic element 14.

According to one embodiment, said first elastic element 14 is accommodated, with a first elastic element end 52 thereof, in a supporting and guiding cup 53 for said first elastic element end.

According to one embodiment, said supporting and guiding cup 53 rests, constantly biasing said active rod end 50.

According to one embodiment, said supporting and guiding cup 53 comprises a rod end-housing 54 which accommodates said active rod end 50.

According to one embodiment, said at least one first elastic element 14 acts between at least one transfer device 13 and a first elastic element support 55.

According to one embodiment, said first elastic element support 55 comprises a bottom 56 and an elastic element guide 57 adapted to cooperate with a second elastic element end 58 so that the second elastic element end 58 rests and is guided during its constant elastic bias.

According to one embodiment, said first elastic element support 55 is adjustable in its position relative to said second chamber 24 so as to modify the preload of said at least one first elastic element 14 in controlled manner.

According to one embodiment, said first elastic element support 55 comprises a safety nut 59 for locking the first elastic element support 55 in a predetermined position.

According to one embodiment, said first elastic element 14 is accommodated in a third chamber 29 formed in a pressure reducing device body 22.

According to one embodiment, said third chamber 29 comprises an elastic element opening 60 which allows the insertion of said first elastic element 14 in said chamber.

According to one embodiment, said elastic element opening 60 is delimited by a threaded wall adapted to receive a bottom 56 having a threading adapted to cooperate with said threading of the elastic element opening 60 to adjust the position of bottom 56.

According to one embodiment, a safety nut 59 comprises an external threading with reverse helix with respect to the threading of bottom 56 so as to be screwed into said elastic element opening 60 and lock said bottom 56 in position.

According to one embodiment, said pressure reducing device 12 comprises at least one second elastic device 61.

According to one embodiment, said at least one second elastic device 61 constantly biases said transfer device 13 in opposition to the bias of said first pressure P1.

According to one embodiment, said at least one second elastic device 61 is arranged between said second plate 27 and said pressure reducing device body 22.

According to one embodiment, said at least one second elastic device 61 is arranged in said second chamber 24.

According to one embodiment, said at least one first elastic element 14 is a helical spring.

According to one embodiment, said at least one second elastic element 61 is a helical spring of predetermined elastic constant K2.

According to one embodiment, said pressure reducing device 12 comprises a pressure reducing device body 22.

According to one embodiment, said pressure reducing device body 22 comprises at least two half-bodies, a first half-body 62 and a second half-body 63.

According to one embodiment, said first half-body 62 delimits said first chamber 23.

According to one embodiment, said first half-body 62 delimits said second chamber 24.

According to one embodiment, said first half-body 62 delimits said fourth chamber 40.

According to one embodiment, said first half-body 62 comprises a half-body coupling end 64 for connecting to said second half-body 63.

According to one embodiment, said half-body coupling end 64 comprises a mounting opening 65 closed by said second half-body 63.

According to one embodiment, said transfer device 13 is inserted through said mounting opening 65 having previously separated said second half-body 63.

According to one embodiment, said first half-body 62 and said second half-body 63 are connected to each other in fluid-tight manner.

According to one embodiment, said second half-body 63 comprises a half-body extension 66 which is inserted in fluid-tight manner in said mounting opening 65.

According to one embodiment, said second half-body 63 delimits said third chamber 29.

According to one embodiment, said second half-body 63 comprises lightening side windows 67.

According to one embodiment, at least one transfer device 13 receives a first pressure P1 or input pressure or control pressure.

According to one embodiment, said at least one transfer device 13 transforms said first pressure P1 into a reduced braking pressure or second pressure P2, whereby avoiding, during the braking action, a fluidic connection between the fluid which has said first pressure P1 and the fluid which has said second pressure P2.

According to one embodiment, at least one first elastic element 14 has an elastic constant K1 of predetermined entity.

According to one embodiment, said at least one first elastic element 14 constantly biases said at least one transfer device 13 in opposition to the bias applied by said first pressure P1, so as to determine a relationship between said first pressure P1 and said second pressure P2 with linear, or proportional, trend, without variation of linearity or proportionality throughout the operating field of the pressure reducing device 12.

According to a general embodiment, a device 12 comprises one or more of the features listed in any one of the embodiments described above.

According to a general embodiment, an assembly or kit comprises a device 12 as described in any one of the embodiments described above and a plurality of first mutually interchangeable elastic elements 14 having mutually different elastic constants K1, . . . Kn to determine different linear relationships between said first pressure P1 and said second pressure P2.

According to a general embodiment, a vehicle 2 comprises a braking system 1 as described in any one of the embodiments indicated above.

A braking pressure reducing method is described below.

Said method comprises the steps of:

applying a first pressure P1 to a first means or fluid;

with said first pressure P1, moving a transfer device 13, whereby transferring the force generated by said first pressure P1 to a second means or fluid, avoiding a fluidic connection between said first and second means or fluid during the transfer of the force;

equal force being transmitted, reducing the pressure into a second pressure P2;

elastically and constantly biasing said transfer device 13 with a first elastic element 14 of predetermined elastic constant K1;

so as to have a linear or proportional relationship between said first pressure P1 and said second pressure P2 without variation of linearity or proportionality throughout the operating field of the method.

According to further criteria for carrying out this method, the further step is provided:

adjusting the proportional relationship law between said first pressure P1 and second pressure P2 by modifying the elastic constant K1 of the elastic element 14.

According to a further criteria for carrying out this method, the further step is provided:

adjusting the preload of the elastic element 14 so as to achieve a delay in the response of the second pressure P2 as the first pressure P1 varies.

According to a further criteria for carrying out this method, the further step is provided of:

applying a force with a pedal 20 or lever;

transforming said force into a first control pressure or input pressure or first pressure P1;

obtaining said first pressure P1 in a first chamber 23 of a pressure reducing device 12, in which said first chamber has a predetermined first thrust section A1;

transferring the force generated by the first pressure P1 on said first thrust section A1 to a second chamber 24 of said pressure reducing device 12 in which said second chamber 24 has a predetermined second thrust section A2 so as to generate a reduced second pressure P2 in said second chamber 24;

avoiding, during the braking action, a fluidic connection between said first chamber 23 and said second chamber 24;

elastically and constantly biasing said second thrust section A2 of said second chamber 24 with a first elastic element 14 of predetermined elastic constant K1 in a direction opposite to said first pressure P1;

conveying said second pressure P2 to a braking device 6 or 7 or 34 or 35.

According to one embodiment, the second chamber has an actual section A2 which is greater than the actual section A1 of the first chamber. In other words, the first plate has a first area of action A1 which is smaller than the area of action A2 of the second plate.

Therefore, the force applied on the pedal of brake F1 being equal, the second pressure P2 obtained in the second chamber with greater area of action is less with respect to the first pressure P1 in the first chamber with smaller area of action, with a proportionality given by A1/A2.

Assuming a stroke of the floating rod having an entity equal to x, a preload of the first elastic element equal to PR1 and a preload of the second elastic element equal to PR2, the following would result at each braking instant:

$$F1=P1*A1=P2*A2+PR2+PR1+(K2x+K1x)$$

Thus, the most important pressure reduction is given by the ratio A1/A2 and there is no second pressure P2 until F1 reaches a value proportional to PR1+PR2; when the preload is exceeded, the second pressure P2 increases linearly proportionately to (K1+K2).

Due to the embodiments described, in addition to differentiating the braking action on the wheels of the same axle (inner curve wheel and outer curve wheel), the tendency of the vehicle to go towards the inside of the curve may be compensated for from the first instants of the braking start, therefore reducing the braking action from the start, the braking action of the wheel(s) on the inner curve side.

Moreover due to the solutions proposed, the braking action on the inner curve wheel may be kept proportional to the outer curve wheel and throughout the field of pressures applied to the braking system, thus making the vehicle much more comprehensible for the driver, and therefore simpler to manage.

Furthermore due to the solutions proposed, albeit while reducing the pressure on the inner curve side of the vehicle with respect to the outer side of the vehicle (or vice versa if required by the performance for example, for an incorrect setting of the vehicle or a different road surface different from the one described above), an immediate differentiation of the braking action may be obtained between the wheels of the same axle and above all, the strongly felt need to allow an adjustment of the braking system according to the track, the road surface and the adjustment or malfunctioning of the vehicle may be met, for example by modifying the preload of the elastic element or replacing the elastic element with one having different elastic features.

Those skilled in the art may make many changes and adaptations to the embodiments described above or can replace elements with others which are functionally equivalent in order to meet contingent needs without however departing from the scope of the appended claims.

According to one embodiment, there is only one connection in which said pressure reducing device 12 is provided and it is a front right wheel connection 10.

According to one embodiment, there is only one connection in which said pressure reducing device 12 is provided and it is a rear right wheel connection 38.

According to one embodiment, there is only one connection in which said pressure reducing device 12 is provided and it is a front left wheel connection 11.

According to one embodiment, there is only one connection in which said pressure reducing device 12 is provided and it is a rear left wheel connection 39.

According to one embodiment, said system 1 only provides said pressure reducing device 12 for both wheels of the same side of the vehicle with respect to the direction of travel of the vehicle. Said system 1 also provides a further symmetric pressure reducing device 33 to reduce the pressure directed to both braking devices 34, 35 of the rear axle 15 to differentiate the braking between the front vehicle axle or first vehicle axle 3 and the rear vehicle axle or second vehicle axle 15.

According to one embodiment, said pressure reducing device 12 is provided for one alone or for both wheels of the same side of the vehicle with respect to the direction of travel of the vehicle.

According to one embodiment, said pressure reducing device 12 is provided for one alone or for both wheels of the same side of the vehicle with respect to the direction of travel of the vehicle and in which said system 1 also provides a further symmetric pressure reducing device 33 to reduce the pressure directed to both braking devices 34, 35 of the rear axle 15 to differentiate the braking between the front vehicle axle or first vehicle axle 3 and the rear vehicle axle or second vehicle axle 15.

LIST OF REFERENCES 1 braking system
2 vehicle
3 first or front vehicle axle
15 second or rear vehicle axle
4 right wheel of first axle
5 left wheel of first axle
36 right wheel of second axle
37 left wheel of second axle
6 front right wheel braking device
7 front left wheel braking device
34 rear right wheel braking device
35 rear left wheel braking device
8 device for applying a braking action by the driver
20 brake pedal or brake lever
9 actuating device (master cylinder)
10 right wheel connection or front right connection
11 left wheel connection or front left connection
38 rear right connection
39 rear left connection
16 right wheel disc brake
19 left wheel disc brake
17 brake disc
18 brake caliper
21 brake cylinder or master cylinder
12 pressure reducing device
22 pressure reducing device body
23 first pressure reducing device chamber or input chamber
24 second pressure reducing device chamber or output chamber
29 elastic device chamber or third chamber 40 fourth separating chamber between first and second chamber
13 transfer device—floating rod
25 floating rod
32 spacer rod portion
50 active rod end
26 input chamber first thrust plate
27 output chamber second thrust plate
51 second plate connecting through holes
28 fluid tank
30 first one-way seal
31 second one-way seal
41 third one-way fluid-tight seal—sealingly arranged between pressure reducing device body and floating rod
42 scraper seal between body and rod
33 symmetric pressure reducing device
43 separating wall of the pressure reducing device body
44 rod through-housing
45 input opening
46 output opening
47 bleeding opening
48 tank opening
49 bleeding device
60 elastic element opening
14 first elastic element
52 first elastic element end
58 second elastic element end
53 supporting and guiding cup
54 rod end-housing
55 first elastic element support
56 bottom
57 elastic element guide
59 safety nut
61 second elastic device
62 first half-body
63 second half-body
64 half-body coupling end
65 mounting opening
66 half-body extension
67 lightening side windows
P1 first pressure or braking pressure command or input pressure
P2 second pressure or reduced braking pressure or output pressure
K1 predetermined first elastic constant
K2 predetermined elastic constant of the second elastic element
A1 input chamber dimension
A2 output chamber dimension
A1 predetermined first plate action area
A2 predetermined second plate action area
F1 front inner curve braking action of the vehicle
F2 front outer curve braking action of the vehicle
F3 rear inner curve braking action of the vehicle

The invention claimed is:

1. A dissymmetric braking system for a vehicle, wherein said vehicle comprises at least one first vehicle axle supported by at least one right axle wheel and at least one left axle wheel,
   wherein said dissymmetric braking system comprises:
   at least one right wheel braking device;
   at least one left wheel braking device;
   at least one device to apply a braking action by a driver;
   at least one actuating device to transform the braking action into a braking pressure command, or first pressure, or input pressure;
   at least one right wheel connection between said at least one actuating device and said at least one right wheel braking device;
   at least one left wheel connection between said at least one actuating device and said at least one left wheel braking device; and
   at least one pressure reducing device in one of said at least one right or left wheel connections;
   said at least one pressure reducing device comprises at least one transfer device which receives said first pressure; and
   wherein said at least one transfer device transforms said first pressure into a reduced braking pressure, or second pressure, or output pressure, whereby avoiding, during the braking action, a fluidic connection between a fluid which has said first pressure and a fluid which has said second pressure, so as to determine, during the braking action, a relationship between said first pressure and said second pressure with a linear, or proportional, trend without variation of linearity or proportionality throughout an operating field of the at least one pressure reducing device, so that the braking action of one of said at least one right wheel braking device and at least one left wheel braking device is lower than the other.

2. The dissymmetric braking system of claim 1, wherein:
said at least one pressure reducing device comprises at least one first elastic element having a first elastic constant of predetermined entity, and
said at least one first elastic element constantly biases said at least one transfer device acting in opposition to the bias of said first pressure.

3. The dissymmetric braking system of claim 1, wherein:
said at least one device to apply a braking action by the driver is at least one brake pedal;
said at least one actuating device is a brake cylinder, or master cylinder, controlled by said at least one brake pedal;
said at least one right wheel connection is a feeding fluid conduit fluidically connecting said brake cylinder to said at least one right wheel braking device; and
said at least one left wheel connection is a feeding fluid conduit fluidically connecting said brake cylinder to said at least one left wheel braking device.

4. The dissymmetric braking system of claim 1, wherein:
said vehicle comprises at least two axles, a first vehicle axle or front axle and a second vehicle axle or rear axle;
each axle comprises a right wheel disc brake comprising a brake disc and a brake caliper located astride the disc brake; and
each axle comprises a left wheel disc brake comprising a brake disc and a brake caliper located astride the disc brake.

5. The dissymmetric braking system of claim 1, wherein:
said at least one device to apply a braking action by the driver is a brake pedal or a brake lever;
said at least one actuating device is two brake cylinders, or dual master cylinder, arranged mutually in parallel and controlled simultaneously by said brake pedal or brake lever;
a first brake cylinder being configured for front braking action and a second brake cylinder being configured for rear braking action or for crossed braking actions between front right or left wheels and rear left or right wheels.

6. The dissymmetric braking system of claim 1, wherein:
said pressure reducing device is provided in only a front right wheel connection;
or wherein
said pressure reducing device is provided in only a rear right wheel connection;
or wherein
said pressure reducing device is provided in only a front left wheel connection;
or wherein
said pressure reducing device is in only a rear left wheel connection;
or wherein
said pressure reducing device is provided in only one of said right or left wheel connections;
or wherein
said pressure reducing device is only provided in both wheels of a same side of the vehicle with respect to travel direction of the vehicle;
or wherein
said pressure reducing device is provided in both front and rear right wheel connections;
or wherein
said pressure reducing device is provided in both front and rear left wheel connections;
or wherein
said fluid is a brake fluid;
and wherein
said dissymmetric braking system is a hydraulic system;
or wherein
said dissymmetric braking system is an electro-hydraulic system in which some components are electrically actuated;
or wherein
said dissymmetric braking system is a brake-by-wire system in which all components are electrically actuated.

7. The dissymmetric braking system of claim 1, wherein said dissymmetric braking system comprises a further symmetric pressure reducing device to reduce pressure directed to both braking devices of the rear axle to differentiate braking between the front axle, or the first vehicle axle, and the rear axle, or the second vehicle axle;
and wherein
said further symmetric pressure reducing device is arranged upstream, closer to the master cylinder, with respect to the pressure reducing device;
or wherein
said further symmetric pressure reducing device is arranged downstream, further from the master cylinder, with respect to the pressure reducing device;
and/or wherein
said pressure reducing device is only provided for one only or for both wheels of the same side of the vehicle with respect to travel direction of the vehicle;
and/or wherein
said pressure reducing device is only provided for one only or for both wheels of the same side of the vehicle with respect to the travel direction of the vehicle and wherein said dissymmetric braking system comprises a further symmetric pressure reducing device to reduce pressure directed to both braking devices of the rear axle to differentiate braking between the front vehicle axle, or the first vehicle axle, and the rear vehicle axle, or the second vehicle axle.

8. The dissymmetric braking system of claim 1, wherein said at least one transfer device transforms said first pressure, or input pressure, into a reduced braking pressure, or second pressure or output pressure, whereby avoiding, during the braking action, a fluidic connection between a fluid having said first pressure and a fluid having said second pressure and avoiding creation of a fluid flow between a receiver of said first pressure and said second pressure;
and wherein
said pressure reducing device comprises a pressure reducing device body;
said pressure reducing device body comprises:
a first pressure reducing device chamber, or input chamber, in which said first pressure is provided;
a second pressure reducing device chamber, or output chamber, in which said second pressure is provided;
and wherein
said input chamber has an input chamber dimension which is transverse to a sliding direction of said at least one transfer device;
said output chamber has an output chamber dimension transverse to a sliding direction of said at least one transfer device;
and wherein said input chamber dimension is smaller than said output chamber dimension;
and/or wherein
said pressure reducing device body comprises:
a third chamber, at least one first elastic element being accommodated in said third chamber;
and/or wherein
said pressure reducing device body comprises:
a fourth chamber arranged between said input chamber and said output chamber and separated from said input and output chambers in fluid-tight manner by a first and a second one-way seal;
and wherein
said output chamber is closed on a side thereof opposite to said input chamber by a separating wall of the pressure reducing device body;
said separating wall comprises a rod through-housing adapted to accommodate said at least one transfer device a in fluid-tight and sliding manner, said at least one transfer device being a floating rod;
and wherein
said rod through-housing is arranged between said output chamber and said third chamber;
and wherein
said rod through-housing comprises a third one-way fluid-tight seal which confines the fluid in said output chamber;
and/or wherein
said rod through-housing comprises a scraper seal between the pressure reducing device body and a rod which acts on an outer skirt of said floating rod;
and/or wherein
said first pressure reducing device chamber or input chamber comprises an input opening adapted to connect said input chamber to said at least one wheel connection in a fluid-tight manner to connect said pressure reducing device to said actuating device;
and wherein
said second pressure reducing device chamber or output chamber comprises an output opening adapted to connect said output chamber to said at least one wheel connection in a fluid-tight manner to connect said pressure reducing device to said at least one wheel braking device;

and/or wherein said first pressure reducing device chamber or input chamber comprises a bleeding opening adapted to connect said input chamber to a bleeding device in a fluid-tight manner;

and/or wherein said pressure reducing device body comprises a tank opening adapted to connect said at least one wheel connection to a fluid tank for accommodating a braking system fluid reserve;

and wherein said tank opening is provided in said fourth chamber;

and wherein said fluid tank is connectable to said output chamber allowing feeding of fluid during a return stroke of a second output chamber thrust plate for recalling by vacuum fluid into the output chamber by said second one-way seal which allows passage of fluid from the outside, from the fourth chamber into the output chamber, if the brake pads in a brake caliper are worn;

and/or wherein said fluid tank is connectable to said input chamber allowing feeding of fluid during the return stroke of an input chamber first thrust plate for recalling by vacuum fluid into the input chamber by said first one-way seal which allows passage of fluid from the outside, from the fourth chamber into the input chamber;

and/or wherein said pressure reducing device body comprises the third chamber or elastic device chamber;

and wherein said third chamber receives said at least one first elastic element;

and wherein said third chamber receives an active rod end at least partially accommodated in said third chamber whereby cooperating with said at least one first elastic element.

9. The dissymmetric braking system of claim 1, wherein said at least one transfer device is a floating rod comprising at least two thrust plates, an input chamber first thrust plate and an output chamber second thrust plate, wherein said input chamber first thrust plate and said output chamber second thrust plate are mechanically connected to one another and integral with the floating rod at a mutually predetermined distance, so that said input chamber first thrust plate is arranged in floating and fluid-tight manner in a first pressure reducing device chamber or input chamber, and said output chamber second thrust plate is arranged in floating and fluid-tight manner in a second pressure reducing device chamber or output chamber;

or wherein said input chamber first thrust plate comprises a predetermined first plate action area of predetermined dimensions transverse to a movement direction of said floating rod;

said output chamber second thrust plate comprises a predetermined second plate action area of predetermined dimensions transverse to the movement direction of said floating rod;

and wherein said predetermined first plate action area is smaller than the predetermined second plate action area;

and/or wherein said floating rod is in one piece with said input chamber first thrust plate and with said output chamber second thrust plate;

and/or wherein a first one-way seal is associated with said input chamber first thrust plate forming a seal in said first pressure reducing device chamber or input chamber, to prevent fluid passage between said input chamber and said output chamber and/or between said input chamber and a fourth chamber;

and/or wherein a second one-way seal is associated with said output chamber second thrust plate forming a seal in said second pressure reducing device chamber or output chamber, between said output chamber and said input chamber and/or between said output chamber and said fourth chamber;

and/or wherein said output chamber second thrust plate comprises second plate connecting through holes for passage of fluid, said second plate connecting through holes being selectively closed by the second one-way seal during the braking action;

and/or wherein said floating rod between said input chamber first thrust plate and said output chamber second thrust plate comprises a spacer rod portion separating the input chamber first thrust plate and the output chamber second thrust plate;

and/or wherein said floating rod is in one piece with an active rod end at least partially accommodated in a third chamber, whereby cooperating with said at least one first elastic element which is accommodated in said third chamber;

and/or wherein said floating rod enters into said input chamber, said floating rod crosses the fourth chamber, said floating rod crosses said output chamber and said floating rod enters into said third chamber.

10. The dissymmetric braking system of claim 1, wherein said at least one transfer device comprises an active rod end constantly biased by at least one first elastic element;

and wherein said at least one first elastic element is accommodated with a first elastic element end thereof in a supporting and guiding cup for said first elastic element end;

and wherein said supporting and guiding cup rests constantly biasing said active rod end;

and wherein said supporting and guiding cup comprises a rod end-housing accommodating said active rod end;

and/or wherein said at least one first elastic element acts between the at least one transfer device and a first elastic element support;

and/or wherein first elastic element support comprises a bottom and an elastic element guide adapted to cooperate with a second elastic element end so that the second elastic element end rests and is guided during its constant elastic bias;

said first elastic element support is adjustable in its position relative to an output chamber to modify a preload of said at least one first elastic element in a controlled manner;

said first elastic element support comprises a safety nut for locking the first elastic element support in a predetermined position;
said at least one first elastic element is accommodated in a third chamber formed in a pressure reducing device body;
said third chamber comprises an elastic element opening which allows insertion of said at least one first elastic element in said third chamber;
and wherein
said elastic element opening is delimited by a threaded wall adapted to receive the bottom having a threading adapted to cooperate with said threading of the elastic element opening to adjust a position of the bottom;
and wherein
the safety nut comprises an external threading with reverse helix with respect to the threading of the bottom so as to be screwed into said elastic element opening and lock said bottom in position;
and/or wherein
said pressure reducing device comprises at least one second elastic device;
said at least one second elastic device constantly biases said at least one transfer device in opposition to the bias of said first pressure;
and/or wherein
said at least one second elastic device is arranged between an output chamber second thrust plate and a pressure reducing device body;
or wherein
said at least one second elastic device is arranged in said output chamber;
and/or wherein
said at least one first elastic element is a helical spring;
and/or wherein
said at least one second elastic device is a helical spring of predetermined elastic constant.

11. The dissymmetric braking system of claim 1, wherein
said pressure reducing device comprises a pressure reducing device body;
said pressure reducing device body comprises at least two half-bodies, a first half-body and a second half-body;
and wherein
said first half-body delimits an input chamber;
or wherein
said first half-body delimits an output chamber;
or wherein
said first half-body delimits a fourth chamber;
and wherein
said first half-body comprises a half-body coupling end for connecting to said second half-body;
said half-body coupling end comprises a mounting opening closed by said second half-body;
and wherein
said at least one transfer device is inserted through said mounting opening having previously separated said second half-body;
and wherein
said first half-body and said second half-body are connected to each other in a fluid-tight manner;
and/or wherein
said second half-body comprises a half-body extension which is inserted in a fluid-tight manner in said mounting opening;
and wherein
said second half-body delimits a third chamber;
and/or wherein
said second half-body comprises lightening side windows.

12. A vehicle braking system pressure reducing device, comprising
at least one transfer device which receives a first pressure, or input pressure, or control pressure;
wherein said at least one transfer device transforms said first pressure into a reduced braking pressure, or second pressure, whereby avoiding, during a braking action, a fluidic connection between a fluid having said first pressure and a fluid having said second pressure;
at least one first elastic element having an elastic constant of predetermined entity;
said at least one first elastic element constantly biases said at least one transfer device in opposition to the bias applied by said first pressure to determine a relationship between said first pressure and said second pressure with linear, or proportional, trend, without variation of linearity or proportionality throughout an operating field of the vehicle braking system pressure reducing device;
wherein a dissymmetric braking system for a vehicle, said vehicle comprising at least one first vehicle axle supported by at least one right axle wheel and at least one left axle wheel, comprises:
at least one right wheel braking device;
at least one left wheel braking device;
at least one device to apply a braking action by a driver;
at least one actuating device to transform the braking action into a braking pressure command, or first pressure, or input pressure;
at least one right wheel connection between said at least one actuating device and said at least one right wheel braking device;
at least one left wheel connection between said at least one actuating device and said at least one left wheel braking device; and
at least one pressure reducing device in one of said at least one right or left wheel connections;
said at least one pressure reducing device comprises the at least one transfer device which receives said first pressure; and
wherein said at least one transfer device transforms said first pressure into the reduced braking pressure, or second pressure, or output pressure, whereby avoiding, during the braking action, the fluidic connection between the fluid which has said first pressure and a fluid which has said second pressure, so as to determine, during the braking action, said relationship between said first pressure and said second pressure with said linear, or proportional, trend without variation of linearity or proportionality throughout said operating field of the at least one pressure reducing device, so that the braking action of one of said at least one right wheel braking device and at least one left wheel braking device is lower than the other.

13. A vehicle comprising a dissymmetric braking system, said vehicle comprising at least one first vehicle axle supported by at least one right axle wheel and at least one left axle wheel, wherein said dissymmetric braking system comprises:
at least one right wheel braking device;
at least one left wheel braking device;
at least one device to apply a braking action by a driver;
at least one actuating device to transform the braking action into a braking pressure command, or first pressure, or input pressure;

at least one right wheel connection between said at least one actuating device and said at least one right wheel braking device;

at least one left wheel connection between said at least one actuating device and said at least one left wheel braking device; and at least one pressure reducing device in one of said at least one right or left wheel connections;

said at least one pressure reducing device comprises at least one transfer device which receives said first pressure; and wherein said at least one transfer device transforms said first pressure into a reduced braking pressure, or second pressure, or output pressure, whereby avoiding, during the braking action, a fluidic connection between a fluid which has said first pressure and a fluid which has said second pressure, so as to determine, during the braking action, a relationship between said first pressure and said second pressure with a linear, or proportional, trend without variation of linearity or proportionality throughout an operating field of the at least one pressure reducing device, so that the braking action of one of said at least one right wheel braking device and at least one left wheel braking device is lower than the other.

14. A method for reducing braking pressure for a dissymmetric braking system for a vehicle, wherein said vehicle comprises at least one first vehicle axle supported by at least one right axle wheel and at least one left axle wheel, wherein said dissymmetric braking system comprises:

at least one right wheel braking device:

at least one left wheel braking device;

at least one device to apply a braking action by a driver;

at least one actuating device to transform the braking action into a first pressure;

at least one right wheel connection between said at least one actuating device and said at least one right wheel braking device;

at least one left wheel connection between said at least one actuating device and said at least one left wheel braking device; and at least one pressure reducing device in one of said at least one right or left wheel connections;

the method comprising:

applying said first pressure to a first means or fluid by said at least one actuating device;

with said first pressure, moving a transfer device of said at least one pressure reducing device, whereby transferring a force generated by said first pressure to a second means or fluid, avoiding a fluidic connection between said first and second means or fluids during transfer of the force; and equal force being transmitted, reducing the first pressure to a second pressure, to have a linear, or proportional relationship between said first pressure and said second pressure without variation of linearity or proportionality throughout an operating field of the method, so that the braking action of one of said at least one right wheel braking device and at least one left wheel braking device is lower than the other.

15. The method of claim 14, further comprising:

elastically and constantly biasing said transfer device with a first elastic element of predetermined elastic constant.

16. The method of claim 15, further comprising adjusting the preload of the first elastic element to achieve a delay in a response of the second pressure as the first pressure varies.

17. The method of claim 14, further comprising:

applying a force with a pedal or lever;

transforming said force into a first control pressure or input pressure or the first pressure;

obtaining said first pressure in a first chamber of the pressure reducing device, said first chamber having a predetermined first thrust section;

transferring the force generated by the first pressure on said first thrust section to a second chamber of said pressure reducing device, said second chamber having a predetermined second thrust section to generate a reduced second pressure in said second chamber;

avoiding, during a braking action, a fluidic connection between said first chamber and said second chamber;

elastically and constantly biasing said second thrust section of said second chamber with a first elastic element in a direction opposite to said first pressure; and conveying said second pressure to a braking device.

* * * * *